June 12, 1951   R. E. BUCK   2,556,415
DOWEL CUTTER
Filed Jan. 25, 1950
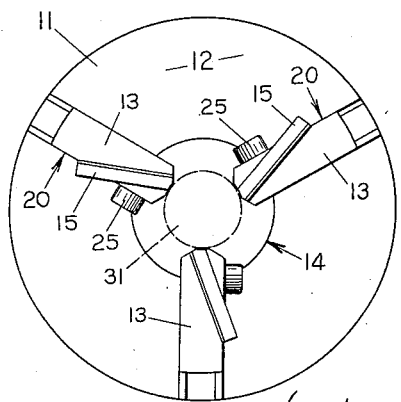
fig. 1
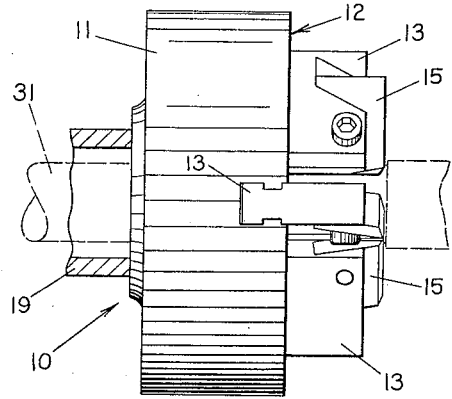
fig. 2
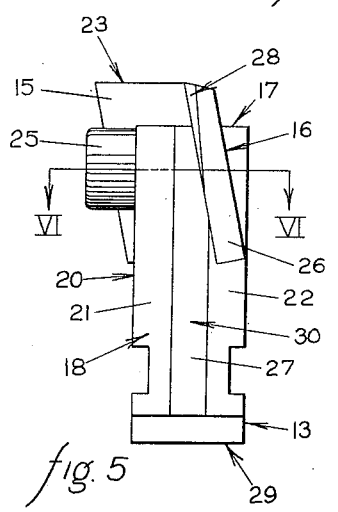
fig. 5
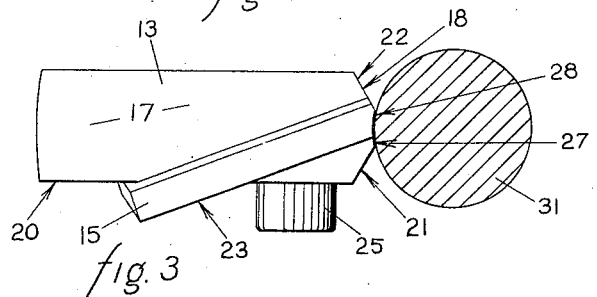
fig. 3
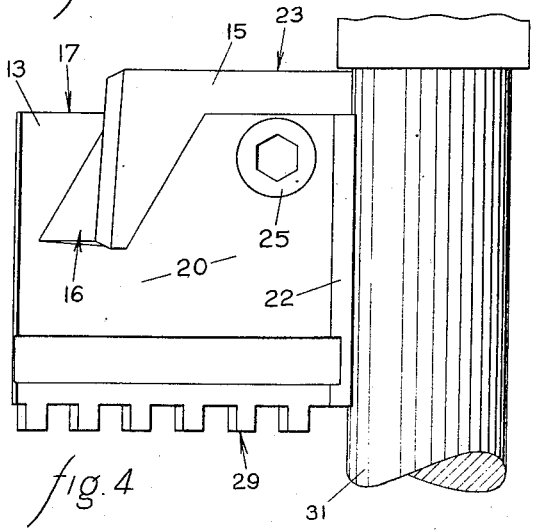
fig. 4
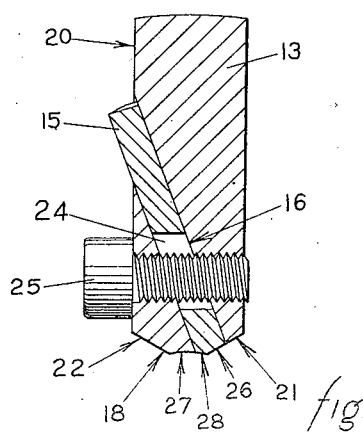
fig. 6
Inventor
RUSSELL E. BUCK
By
Attorney Patented June 12, 1951

2,556,415

UNITED STATES PATENT OFFICE 2,556,415

DOWEL CUTTER

Russell E. Buck, Kalamazoo, Mich., assignor to Buck Tool Company, Kalamazoo, Mich., a corporation of Michigan Application January 25, 1950, Serial No. 140,493

4 Claims. (Cl. 142—29)

This invention relates in general to a tool for cutting a dowel or other cylindrical work, and more particularly to a type thereof mountable upon the spindle of a standard lathe head for rotation thereby.

Persons familiar with the operation of woodworking machinery have long recognized the impracticability of producing tenons or dowels on a standard lathe with conventional tools. Among other problems, such dowels have heretofore been limited by the length of the lathe bed. Attempts which have been made to provide a special tool adaptable to a standard lathe head for cutting doweling have, insofar as I know, met with failure. Prominent among the difficulties causing these failures are chattering by the work, or disfiguration of its surface, as it passes through the cutter, which may also result in injury to the cutting tool.

Accordingly, the primary object of this invention is the provision of a tool mountable upon a lathe head for cutting cylindrical objects, said tool having guide means for engaging the objects immediately upon the formation thereof.

A further object of this invention is the provision of a tool for producing cylindrical objects, as aforesaid, wherein the blades of the cutting tool are so set that the actual cutting operation occupies a very short space along the stock from which the cylindrical object is being shaped.

A further object of this invention is the provision of a cutter utilizing an open center, universal chuck wherein the cutting blades are mounted upon the chuck jaws, and wherein the radially inner edges of said jaws and blades are positioned to cooperate in guiding the work immediately after the cutting operation.

Other objects and purposes of this invention will become apparent to persons familiar with this type of equipment upon reference to the accompanying drawings and upon reading the following specification.

In meeting the above objects and purposes, as well as others incidental thereto and associated therewith, I have provided a conventional, cylindrical, universal chuck mountable up a lathe spindle and having a plurality of radially adjustably jaws mounted on one axial end face of the chuck. Upon each jaw of said chuck is mounted blade having a cutting edge substantially parallel with, and spaced remotely from, the said face of said chuck. The radially inner edges of each blade, and the corresponding jaw in which said blade is mounted, are provided with aligned surfaces, which may be concave or flat. The said inner edge of each blade is substantially perpendicular to, and intersects with, the said cutting edge of the blade. The said surfaces on the several jaws and blades combine to define an imaginary cylinder co-axial with the chuck.

For illustration of a preferred embodiment of my invention, attention is directed to the accompanying drawing in which:

Figure 1 is a front elevation of a universal chuck with the jaws mounted thereon.

Figure 2 is a side elevation view of the said chuck and jaws.

Figure 3 is a front view of a single chuck jaw with a cutting blade mounted thereon.

Figure 4 is a side elevation view of a said jaw and blade mounted thereon.

Figure 5 is an end elevation view of said jaw and blade mounted thereon as viewed from the radially inner end of said jaw.

Figure 6 is a sectional view substantially as taken along the line VI—VI of Figure 5.

Construction

For the purpose of convenience in description, the terms "inner" or "inwardly" and "outer" or "outwardly," as used in the following specification, will be understood as having reference to the geometric center of the dowel cutter 10. The terms "front" or "forwardly" and "rear" or "rearwardly" shall be understood to mean rightwardly and leftwardly, respectively, of the dowel cutter 10 and parts thereof when positioned as appearing in Figure 2. Accordingly, Figure 1 discloses the front of the dowel cutter 10 and parts associated therewith.

As shown in Figures 1 and 2, the dowel cutter 10 in this particular embodiment of this invention, is comprised of a conventional, cylindrical, universal chuck 11 having a front face 12 upon which are mounted a plurality, here three, of jaws 13 which are radially and simultaneously adjustable toward and away from the axis of the chuck by any convenient, conventional means not specifically shown or described in this application. The chuck 11 is provided with a co-axial, cylindrical center opening 14 therethrough by means of which said chuck 11 is threadedly mountable upon a hollow lathe spindle 19 in a conventional manner. Since this invention is not dependent upon the exact shape or type of chuck used, other than the fact that it is a universal chuck and has an open center, further details relating thereto are omitted.

It will also be understood that since all of the jaws 13 may be, and preferably are, identical, and further since the manner in which the cutting blade 15 is mounted upon each jaw is also preferably identical, the following full description of one jaw and its corresponding cutting blade will be considered applicable to, and fully descriptive of, the other jaws and cutting blades mounted upon the chuck 11.

As shown in Figures 3, 4, 5 and 6, the jaw 13, whose front face 17 is substantially rectangular (Figure 3), is provided with a blade slot 16, which extends rearwardly of face 17 approximately half way through the jaw. The slot 16 opens at one end thereof through the radially inner face 18 (Figure 5) of the jaw 13, and opens at the other end thereof through a side face 20 thereof. It will be noted (Figures 6 and 5) that the slot 16 is also disposed at an angle to the longitudinal extent of both the front face 17 and the inner face 18 of the jaw 13, for reasons hereinafter discussed in detail.

The inner face 18 (Figures 5 and 6) may be provided with beveled edges 21 and 22 in which case the slot 16 preferably opens primarily through that beveled edge portion 22 of the inner face 18, which is remote from the side face 20.

The cutting blade 15 which is disposed within the blade slot 16 in the jaw 13, extends somewhat forwardly of the front face 17. This extended portion of the cutting blade 15 is beveled and sharpened to provide a cutting edge 23, which edge is preferably adjacent to the side face 20 and parallel with the front face 17.

The blade 15 is provided with an elongated adjustment opening 24 (Figure 6), through which the adjustment bolt 25 extends and whereby said blade may be adjusted toward and away from the inner face 18. The adjustment bolt 25 is threadedly engaged by the jaw 13 on the opposite sides of the slot 16 therein so that the blade 15 may be secured within said slot 16 by tightening the bolt 25.

The inner face 18 of the jaw 13 and a portion of the inner edge 26 of the blade 15 are preferably simultaneously machined to provide a guide surface 27 (Figures 5 and 6). This guide surface 27, which is disposed between the beveled edges 21 and 22, is comprised of a portion 30 on the jaw 13 and a portion 28 on the blade 15 aligned with said portion 30. The surface 27 extends, by its two aligned portions 28 and 30, from the cutting edge 23 to the rearward end 29 of the jaw 13. The angular disposition of the blade 15 within the jaw 13 limits the extent of the portion 28 of the total guide surface 27 contributed by the blade inner edge 26. However, the presence of the blade portion 28 is essential as it is directly adjacent to the cutting edge 23 and therefore provides the necessary work support immediately behind said cutting edge. It will be recognized that the blade portion 28 may be enlarged considerably or decreased somewhat in surface area without departing from the scope of this invention. The important factor resides in the existence of a guide surface 27 having a portion 28 thereof on the blade 15 adjacent to, and intersecting, the cutting edge 23. Said guide surface 27, which may be substantially planar, is preferably concave and coincident with the periphery of the largest dowel 31 which may be fabricated by the cutter 10, when the jaws 13 are operably mounted upon the chuck 11.

The chuck 11, as shown in Figure 1, rotates in a counterclockwise direction. Thus, the blades are angularly disposed with respect to the jaw 13 to effect the optimum cutting action. The particular disposition of the blades 15, here shown, will produce such optimum cutting action, while providing a portion 28 of the blade 15 in line with a portion 30 on the jaw 13 to cooperate therewith in defining the guide surface 27.

In a preferred manner of preparing the cutter 10 for initial operation, the blades 15, sharpened along their cutting edges 23 and are placed in the slots 16 in their corresponding jaws 13 so that their inner edges 26 extend slightly inwardly of the inner face 18 of the jaw 13, after which the adjustment bolts 25 are tightened. The jaws 13 are then positioned upon the chuck 11 so that their inner faces 18 are slightly inwardly of the periphery of the largest dowel 31 which will be produced by the cutter 10. A cylindrical grinding tool having a diameter substantially equal to said largest dowel is then advanced between the inner edges 26 of the blades 15 and the inner faces 18 of the said jaws 13, whereby the concave guide surfaces 27 are provided. The guide surfaces 27 may be provided by any other conventional machining method producing a surface of commensurate smoothness. Dowels of various smaller diameters may be produced with the cutter 10 by simply moving the jaws inwardly. The fact that the radii of the guide surfaces 27 will be greater than the radii of such smaller dowels will not materially alter the guiding properties of said surfaces.

Operation

In operation, with the chuck 11 rotating at a relatively high rate, at 2000 R. P. M., the dowel 31, or other cylindrical work, to be produced is advanced coaxially with the chuck 11 toward the cutting edges 23 of the blades 15. As the dowel 31, cut by the blades, begins to pass therebetween, it is immediately engaged and guided by the blade portions 28 of the guide surfaces 27. Continued advancement of the dowel 31 brings it into engagement with the jaw portions 30 of the guide surfaces 27 and ultimately out through the rear of the chuck 11.

If it becomes desirable to resharpen the cutting edges 23 or to reface the guide surfaces 27, such can be accomplished by removing the blades from the jaws, or readjusting the blades within the slots 16, and then repeating the procedure above described for providing the guide surface on each jaw and blade. The immediate engagement of the dowel 31 by the blade portion 28 of the guide surface 27 positively prevents chattering and the resulting disfiguration of the finished dowel. In addition the guide surfaces 27 tend to polish the finished dowel as it is advanced therebetween.

Although specific reference has frequently been made in the foregoing to the use of the device as a dowel cutter, it will be appreciated that the said device is equally applicable to the cutting of tenons or any other cylindrical parts from non-round stock. Furthermore, although the above mentioned drawings and description apply to one particular embodiment of the invention, it is not my intention, implied or otherwise to eliminate other variations or modifications which do not depart from the scope of the invention unless specifically stated to the contrary in the hereinafter appended claims.

I claim:

1. A cutting tool comprising: an open center universal chuck and a plurality of radially adjustable jaws mounted on one axial face thereof, the radially inner face of each jaw being provided with a guide surface, the guide surfaces of all the jaws together defining an imaginary cylinder coaxial with said chuck; and a blade mounted upon each jaw, said blade having a cutting edge substantially parallel with and remote from said face of said chuck and having a bearing edge intersecting said cutting edge and forming an extension of said guide surface; whereby the work passing said cutting edges is guided through said chuck by said guide surfaces.

2. A tool for producing a cylindrical object, comprising: an open center, universal chuck and a plurality of radially adjustable jaws mounted on one axial face thereof; and a blade mounted upon each jaw, said blade having a radially disposed cutting edge remote from said chuck, and a radially inner edge positioned in alignment with the surface of the radially inner face of said jaw, for providing an extension thereof, and intersecting said cutting edge substantially perpendicularly thereto, the radially inner edge and surface of each blade and jaw combining to define a cylinder coaxial with said chuck and tangent to each said edge and surface; whereby said object passing the cutting edges is guided through the chuck by each edge and surface.

3. A cutting tool comprising: a universal chuck having an opening therethrough and a plurality of jaws mounted on one face thereof for radial movement toward and away from the centerline of said opening, each jaw having a radially inner face provided with a guide surface, and the combined guide surfaces of said jaws defining an imaginary cylinder coaxial with said opening; and a blade mounted upon each jaw, said blade having a bearing surface along one edge thereof forming an extension of said guide surface, and having a cutting edge intersecting, and substantially perpendicular to, said bearing surface; whereby the work engaged by, and passing between, said cutting edges is guided through said chuck by said bearing and guide surfaces.

4. An improved cutting tool comprising: a cylindrical, open center, universal chuck and a plurality of radially adjustable jaws mounted on one axial face thereof, the radially inner faces of said jaws having concave surfaces defining a cylinder coaxial with said chuck; and a blade adjustably mounted upon each jaw, said blade having a bearing edge flush with and forming an extension of the concave surface on the jaw supporting each respective blade and having a cutting edge remote from said chuck and extending substantially perpendicularly and radially from said bearing surface; whereby work passing the cutting edges is guided through said chuck by said bearing and concave surfaces.

RUSSELL E. BUCK.

REFERENCES CITED

The following references are of record in the file of this patent:

UNITED STATES PATENTS

| Number | Name | Date |
| --- | --- | --- |
| 345,662 | Blaney | July 20, 1886 |
| 383,369 | Philion | May 22, 1888 |
| 943,540 | Harrold | Dec. 14, 1909 |
| 2,338,301 | Robinson | Jan. 4, 1944 |